United States Patent Office 2,979,518
Patented Apr. 11, 1961

1

2,979,518

NEW STEROID ALANINATES

David Adriaan van Dorp and Hendrik Paul de Jongh, Oss, Netherlands, assignors to Organon Inc., Orange, N.J., a corporation of New Jersey No Drawing. Filed July 30, 1957, Ser. No. 675,041

Claims priority, application Netherlands Aug. 14, 1956

10 Claims. (Cl. 260—397.45)

This invention relates to new aminomonocarboxylic acid esters of steroid compounds, which have at least one double bond in the nucleus, to the acid-addition salts of these esters and to the preparation of these compounds.

These new compounds are of special importance owing to their biological activity which, qualitatively, in many cases corresponds to the steroids from which they have been derived, in some cases, however, shows considerable deviations therefrom. A great advantage of these compounds is the very ready solubility of their salts in water, e.g. the hydrohalogenic acid salts.

As starting substances for the preparation of these new amino acid esters are employed steroids which have one or more esterifiable hydroxyl groups and which contain at least one double bond in the nucleus and which may in addition be substituted by one or more free or functionally converted hydroxyl and oxo groups, halogen atoms and saturated or unsaturated lower hydrocarbon groups.

By a functionally converted hydroxyl group is understood an etherified or esterified hydroxyl group. The etherified hydroxyl group may e.g. be a methoxy, tetrahydropyranyloxy, benzyloxy, or triphenylmethoxy group. An esterified hydroxyl group may be a hydroxyl group esterified with an aliphatic, aromatic or araliphatic carboxylic acid, e.g. formic acid, acetic acid, cyclohexyl butyric acid, benzoic acid, and $\beta$-phenylpropionic acid.

By a functionally converted oxo group is understood e.g. an enolester, enolether, acetal, mercaptal, enamine, oxim and hydrazone grouping.

The free or functionally converted hydroxyl and oxo groups possibly present in the starting substances may occur e.g. in the positions 1, 2, 3, 4, 6, 7, 8, 9, 11, 12, 14, 15, 16, 17, 20, and 21.

A lower hydrocarbon group which may be both saturated and unsaturated, e.g. a methyl, ethyl, vinyl, and ethinyl group, may occur e.g. in the positions 1, 2, 4, 6, 10, 13, and 17.

A halogen atom may e.g. occur in the positions 1, 2, 4, 6, 9, 11, 12, 15, 16, and 21.

The hydroxy steroids to be applied as starting substances may have any steric configuration and may be 18-nor, 19-nor, 18,19-bisnor, C-nor or D-homo steroids. Especially the unsaturated hydroxy steroids of the androstane, oestrane, and pregnane series are employed for the present esterification.

The esterification may take place at one or more of the esterifiable hydroxyl groups. Especially the hydroxyl groups, present in the positions 3, 11, 16, 17, and 21, are considered for this purpose.

The following steroids are mentioned by name as starting substances for the present process:

$\Delta^4$-17$\beta$-hydroxy-3-oxo-androstene
$\Delta^4$-17$\beta$-hydroxy-3-oxo-17$\alpha$-methyl androstene
$\Delta^4$-17$\beta$-hydroxy-3-oxo-17$\alpha$-vinyl-androstene
$\Delta^4$-17$\beta$-hydroxy-3-oxo-19-nor-androstene
$\Delta^5$-3$\beta$,17$\beta$-dihydroxy-androstene
$\Delta^5$-3$\beta$-hydroxy-17-oxo-androstene

2

$\Delta^{1,3,5}$-3-hydroxy-17-oxo-oestratriene
$\Delta^{1,3,5}$-3,17$\beta$-dihydroxy-oestratriene
$\Delta^{1,3,5}$-3,17$\beta$-dihydroxy-17$\alpha$-ethinyl-oestratriene
$\Delta^{1,3,5}$-3,17$\beta$-dihydroxy-1-methyl oestratriene
$\Delta^{1,3,5}$-3,16$\alpha$,17$\beta$-trihydroxy-oestratriene
$\Delta^{1,4}$-17$\beta$-hydroxy-3-oxo-androstadiene
$\Delta^4$-21-hydroxy-3,20-dioxo-pregnene
$\Delta^4$-11$\beta$,21-dihydroxy-3,20-dioxo-pregnene
$\Delta^4$-21-hydroxy-3,11,20-trioxo-pregnene
$\Delta^4$-17$\alpha$,21-dihydroxy-3,20-dioxo-pregnene
$\Delta^4$-11$\beta$,17$\alpha$,21-trihydroxy-3,20-dioxo-pregnene
$\Delta^4$-17$\alpha$,21-dihydroxy-3,11,20-trioxo-9$\alpha$-fluoro-pregnene
$\Delta^4$-11$\beta$,17$\alpha$,21-trihydroxy-3,20-dioxo-9$\alpha$-fluoro-pregnene
$\Delta^4$-17$\alpha$,21-dihydroxy-3,11,20-trioxo-pregnene
$\Delta^4$-17$\alpha$-hydroxy-3,20-dioxo-pregnene
$\Delta^5$-20-oxo-3$\beta$-hydroxy-pregnene
$\Delta^{1,4}$-17$\alpha$,21-dihydroxy-3,11,20-trioxo-pregnadiene
$\Delta^{1,4}$-11$\beta$,17$\alpha$,21-trihydroxy-3,20-dioxo-pregnadiene
$\Delta^{1,4}$-17$\alpha$,21-dihydroxy-3,11,20-trioxo - 9$\alpha$-fluoro-pregnadiene
$\Delta^{1,4}$-11$\beta$,17$\alpha$,21-trihydroxy-3,20-dioxo- 9$\alpha$-fluoro-pregnadiene Especially the $\Delta^{1,3,5}$-oestratriene compounds and the $\Delta^4$ and $\Delta^{1,4}$-3-oxo compounds of the androstane and pregnane series, which have an activity in the non-esterified form, result, in the present esterification, in important biologically active compounds.

The esterification of the unsaturated hydroxy steroids is carried out with an aminomonocarboxylic acid which can be employed in one of its optically active forms or as a racemate. The amino acids may be e.g. monoaminomonocarboxylic acids and diaminomonocarboxylic acids, such as glycine, $\alpha$- and $\beta$-alanine, valine, leucine, norleucine, isoleucine, norvaline, $\alpha$-amino btuyric acid, phenylalanine, proline, lysine, ornithine, and amino benzoic acid, such as p-amino benzoic acid.

For the esterification of the hydroxy steroids with amino acids according to the invention it is necessary that the amino group(s) of the latter compounds be protected. As a protecting group there is preferably employed a carbobenzoxy group, such as has been described in Advances in Protein Chemistry, vol. V, page 25 and following pages.

The esterification of the hydroxy steroid with e.g. a carbobenzoxy amino acid may take place by carrying out the reaction in the presence of a dehydrating agent, e.g. ethoxyacetylene. The ester in question can also be prepared by reaction of the anhydride or acid chloride of the used amino acid derivative with the hydroxy steroid in question.

After the esteterification the carbobenzoxy group can be split off e.g. by catalytic reduction as has been described in Advances in Protein Chemistry, vol. V, page 29 and following pages. The protecting group, however, is preferably split off by means of a hydrohalogenic acid, e.g. hydrobromic acid. The advantage of this method is that the double bonds present in the esterified steroid are not reduced.

The esterification of the hydroxy steroid with a carbobenzoxy-aminomonocarboxylic acid is e.g. carried out by heating the two components in a suitable solvent and in the presence of a dehydrating agent for some time. As a solvent may be used e.g. an ether, such as methyl ethyl ether, diethyl ether, dioxane and tetrahydrofurane, an ester, such as ethyl acetate, an aromatic hydrocarbon, e.g. benzene, a ketone, such as acetone, a halogenated hydrocarbon, e.g. dichloroethane, or a mixture of these solvents.

Usually the reaction time lies between 1 and 24 hours, while the reaction temperature amounts to about 40–80° C, It is also possible to carry out the esterification by means of a carbobenzoxy amino acid anhydride or chloride in a solution of an organic base, preferably a tertiary base, such as pyridine and chinoline.

In case it is desired to split off the carbobenzoxy group—after the esterification—by means of a catalytic reduction, the α,β-unsaturated oxo grouping possibly present in the steroid compound should be protected e.g. by ketalization. This protection may also be carried out already prior to the esterification. From the formed ester the carbobenzoxy group is now split off in a neutral medium by catalytic reduction in a suitable solvent, such as an alcohol, an ether, an ester, or a mixture thereof. After filtering off the catalyst and evaporating the solvent in vacuo, the ketalized amino acid steroid ester is introduced into water and stirred in it for some hours in the presence of a little inorganic acid. As an acid there may be used hydrochloric acid, hydrobromic acid, or hydriodic acid. The reaction time lies between about 1 and 8 hours and the reaction temperature between about 15° and 80° C. In this manner the liberation of the α,β-unsaturated ketone and the formation of the halogen salt of the new ester are simultaneously effected. After filtration or centrifugation the ester is taken up in water, after which the aqueous solution is evaporated to dryness in vacuo or lyophilized. In this manner the salt of the amino acid ester is obtained in a dry form.

The protecting carbobenzoxy group is preferably split off by means of a hydrohalogenic acid, e.g. hydrobromic acid. This splitting is carried out e.g. in absolute dioxane or glacial acetic acid. In this manner the salt of the applied hydrohalogenic acid, e.g. the HBr-salt, of the amino acid steroid esters is obtained directly.

Of some compounds, prepared according to the present process, especially the salts, it was found that they exert a favourable action on the fat metabolism. In addition these compounds are of importance owing to the antiphlogistic action which some of these compounds show on local application.

*Example Ia*

9.96 g. of Δ⁵-3-ethylenedioxyandrostene-17β-ol, 6.72 g. of N. carbobenzoxyglycine, 3 ml. of ethoxyacetylene in 150 ml. of benzene are heated under gentle boiling for 5 hours. During the reaction everything goes into solution. After completion of the reaction the reaction mixture is evaporated to dryness in vacuo. The residue is taken up in little benzene. Added to this are about 500 ml. ethanol with 1 drop of pyridine. Evaporation to about 200 ml. at normal pressure. After cooling crude Δ⁵-3-ethylene-dioxyandrostene-17β-ol-17 N. carbobenzoxy glycinate crystallizes out. Yield 8 g. or 51% of the theoretical. M.P.: 160–165° C. Recrystallization from ethanol with 1 drop of pyridine yields the pure compound of M.P. 166–169° C. $(\alpha)_D = -33.6°$ (chloroform).

*Analysis.*—Calculated for $C_{31}H_{41}O_6N$: N=2.67%. Found: N=2.71%.

*Example Ib*

6 g. of Δ⁵-3-ethylenedioxy-androstene-17β-ol-17-N. carbobenzoxyglycinate are dissolved, while heating, in 600 ml. of 96% ethyl alcohol. After cooling 3 g. of palladium on carbon (5% palladium) are added and hydrogen is led through for 3 hours with violent stirring at a temperature of about 30° C. The escaping gas mixture is led through barium hydroxide (saturated solution) and the formed barium carbonate is weighed. After completion of the reaction the solution is filtered over hyflo from the catalyst. The residue on the filter is washed with some ml. of chloroform. The filtrate is evaporated to dryness in vacuo. The crude compound is dissolved in about 200 ml. of benzene and filtered off from the insoluble fraction. The filtrate is evaporated to dryness in vacuo. The yield of Δ⁵-3-ethylene-dioxyandrostene-17β-ol-17-glycinate is 3.6 g. or 81% of the theoretical. M.P.: 186–190° C. (decomposition). To obtain pure ethyleneketal of testosterone glycinate the crude product is recrystallized from benzene-petroleum-ether (60–80° C.), 2:1. M.P.: 195–199° C. (decomposition). $(\alpha)_D = -48°$ (chloroform).

*Analysis.*—Calculated for $C_{23}H_{35}O_4N$: N=3.59%. Found: N=3.56%.

*Example Ic*

Suspend 1.28 g. of Δ⁵-3-ethylenedioxy-androstene-17β-ol-17-glycinate in 100 ml. of H₂O and 2 ml. of 2 N HCl. Stir at room temperature for 3 hours. Centrifuge the cloudy solution. Decant and lyophilize the clear aqueous solution. Yield: 0.76 g. or 60.5% of the theoretical of hydrochloric acid salt of 3-keto-Δ⁴-androstene-17β-ol-17-glycinate. Decomposition at about 200° C. U.V. absorption:

Lambda max. (in alcohol): 241mμ
Epsilon=14,100 (in alcohol)
Lambda max. (in water): 248 mμ
Epsilon=13,500 (in water)
$(\alpha)_D = +67.9°$ (ethanol)

*Analysis.*—Calculated for $C_{21}H_{32}O_3NCl$: N=3.66%. Found: N=3.33%.

*Example IIa*

7.2 g. of testosterone, 5.5 g. of carbobenzoxyglycine, and 2.6 ml. of ethoxyacetylene are dissolved in 110 ml. of benzene. Heating, while stirring, under gentle boiling for 6 hours. Evaporation in vacuo and taking up the residue in ether after completion of the reaction. The 3-ketone-Δ⁴-androstene-17β-ol-N. carbobenzoxyglycinate crystallizes out slowly. After filtering off the substance is recrystallized from methanol. M.P.: 162–163.5° C. $(\alpha)_D = +69.6°$ (chloroform).

*Analysis.*—Calculated for $C_{29}H_{37}O_5N$: N=2.92%. Found: N=3.03%.

From the testosterone have been prepared in a corresponding manner: Δ⁴-3-oxo-17β-hydroxy-androstene-17β-(N-carbobenzoxy)-alaninate and Δ⁴-3-oxo-17β-hydroxy-androstene-17β-(N-carbobenzoxy)-phenylalaninate.

*Example IIb*

5 g. of 3-keto-Δ⁴-androstene-17β-ol-N. carbobenzoxyglycinate are dissolved in 150 ml. of absolute dioxane. Now, for 100 minutes, dry HBr-gas is led through while cooling with ice water. The 3-keto-Δ⁴-androstene-17β-ol-17-glycinate-HBr separates as a reddish-brown oil. Evaporation in vacuo as a result of which the oil crystallizes. The crystals are dissolved in water, the solution is shaken out with petroleum-ether (40–60°) to remove formed benzylbromide, treated with norit, filtered, and lyophilized. Yield quantitative. Decomposition above 270° C. Recrystallization from alcohol-ether. $(\alpha)_D = +64.8°$ (ethanol). U.V.-absorption:

Lambda max. (alc.)=241 mμ
Epsilon=14,400

*Analysis.*—Calculated for $C_{21}H_{32}O_3NBr$: N=3.28%. Found: N=3.15%.

In an analogous manner the following water soluble salts have been prepared: Δ⁴-3-oxo-17β-hydroxy-androstene-17β-alaninate-HBr and Δ⁴ - 3 - oxo - 17β - hydroxy-androstene-17β-phenylalaninate-HBr.

*Example IIIa*

A solution of 21.76 g. of Δ¹,³,⁵,17β-dihydroxy-oestratriene (oestradiol) and 33.17 g. of carbobenzoxy-glycine in 700 ml. of 1,2-dichloroethane and 17 ml. of ethoxyacetylene is refluxed, with stirring, for 16 hours. After completion of the reaction the reaction mixture is evaporated to dryness in vacuo. The residue is chromatographed over silica gel, in which benzene with an increasing acetone content is used as elution agent. From the benzene-acetone fractions (95:5) 21.75 g. of oestradiol-3,17β-di-(N-carbobenzoxy)-glycinate are obtained as an oil; $(\alpha)_D = +21.0°$ (chloroform).

Analysis.—Calculated for $C_{38}H_{42}O_8N_2$: N=4.28%. Found: N=4.19%.

The I.R. spectrum (in $CH_2Cl_2$) shows bands at 2.92, 5.65, 5.80, 6.20, 6.30, and 6.60μ.

In an analogous manner the following 3,17β-di-(N-carbobenzoxy)-amino acid esters of the oestradiol have been prepared:

Oestradiol-3,17β-di(N-carbobenzoxy)-alaninate
Oestradiol-3,17β-di(N-carbobenzoxy)-phenyl alaninate

Example IIIb

To a solution of 13.1 g. of oestradiol-3,17β-di-(N-carbobenzoxy)-glycinate in 75 ml. of absolute dioxane are added 42.5 g. of a HBr solution in dioxane containing 19% by weight of HBr. The mixture is shaken at room temperature for 90 minutes, after which the formed precipitate is filtered off. This precipitate is dissolved in water, after which the solution is treated with norit. The thus obtained clear aqueous solution is lyophilized, after which 5.72 g. of crude oestradiol-3,17β-diglycinate-HBr are obtained. Recrystallization from a mixture of ethanol and ether yields white crystals which decompose at 245–255° C.; $(\alpha)_D = +23.6°$ (ethanol).

Analysis.—Calculated for $C_{22}H_{32}O_4N_2Br_2$: Found: N=5.10%. Found: N=4.88%.

In a corresponding manner the following esters have been prepared:

Oestradiol-3,17β-di-alaninate-HBr
Oestradiol-3,17β-di-phenyl alaninate-HBr

Example IVa 18 g. of Δ⁴-3,11,20-trioxo-17α,21-dihydroxy-pregnene, 10.75 g. of carbobenzoxyglycine in 250 ml. of 1,2-dichloroethane and 6 ml. of ethoxyacetylene are heated under reflux, while stirring, for 6.5 hours. The resulting clear solution is evaporated to dryness in vacuo. The residue is taken up in 250 ml. of ethanol, after which this solution is evaporated to about 150 ml. After 48 hours at room temperature the Δ⁴-3,11,20-trioxo-17α,21-dihydroxy-pregnene-21-(N-carbobenzoxy)-glycinate crystallizes out. The M.P. hereof is 186.5–187.5° C.; $(\alpha)_D = +171.5°$ (chloroform). Lambda max (ethanol)=238 mμ; epsilon=15,100.

Analysis.—Calculated for $C_{31}H_{37}O_8N$: N=2.54%. Found: N=2.45%.

In a corresponding manner the following N-carbobenzoxy-amino acid esters have been prepared:

Cortisone-21-(N-carbobenzoxy)-alaninate and
Cortisone-21-(N-carbobenzoxy)-phenyl alaninate

Example IVb 5.5 g. of Δ⁴-3,11,20-trioxo-17α,21-dihydroxy-pregnene-21-(N-carbobenzoxy)-glycinate are dissolved in 25 ml. of absolute dioxane. Then 6 ml. of dioxane containing 24.2% hydrobromic acid are added to the solution. The reaction mixture is kept at room temperature for 90 minutes, after which the dioxane is evaporated in vacuo. The oily residue is taken up in water and then extracted with chloroform. The aqueous layer is separated, treated with norit, filtered and then lyophilized.

After recrystallizing the resulting pale yellow powder from a mixture of absolute and ethanol and ether the Δ⁴-3,11,20-trioxo-17α,21-dihydroxy-pregnene-21-glycinate-HBr is obtained. The compound melts under decomposition. $(\alpha)_D = +164°$ (ethanol).

Analysis.—Calculated for $C_{23}H_{32}O_6N$ Br: N=2.81%. Found: N=2.58%.

Lambda max. (alc.)=238 mμ; epsilon=14,500
Lambda max. (water)=245 mμ; epsilon=15,400

After acetylation the Δ⁴-3,11,20-trioxo-17α,21-dihydroxy-pregnene-21-(N-acetyl)-glycinate is obtained; M.P. 234–235° C.

Analysis.—Calculated for $C_{25}H_{33}O_7N$: N=3.05%. Found: N=3.34%.

In an almost analogous manner the following salts have been prepared:

Cortisone-21-alaninate-HBr and
Cortisone-21-phenyl alaninate-HBr

Example Va

A solution of 21.48 g. of Δ¹,⁴-3,11,20-trioxo-17α,21-dihydroxy-pregnadiene and 14 g. of carbobenzoxyglycine in 250 ml. of absolute dioxane and 6 ml. of ethoxyacetylene is heated at 80–90° C. for 7 hours. Subsequently the reaction mixture is evaporated to dryness in vacuo. The residue is dissolved in 300 ml. of ethanol, after which this solution is evaporated to half the volume. After standing for some time the Δ¹,⁴-3,11,20-trioxo-17α,21-dihydroxy-pregnadiene - 21 - (N-carbobenzoxy)-glycinate crystallizes out. The M.P. hereof is 186–189° C. Yield: 14.91 g. After recrystallization from ethanol the pure compound of M.P. 188–189° C. is obtained; $(\alpha)_D = +152.5°$ (chloroform).

Analysis.—Calculated for $C_{31}H_{35}O_8N$: N=2.55%. Found: N=2.40%.

Lambda max. (alc.)=239 mμ
Epsilon=15,000

In an analogous manner the following esters of the prednisone have been prepared:

Prednisone-21-(N-carbobenzoxy)-alaninate
Prednisone-21-(N-carbobenzoxy)-phenyl alaninate

Example Vb 16.48 g. of Δ¹,⁴-3,11,20-trioxo-17α,21-dihydroxy-21-pregnadiene-21-(N-carbobenzoxy)-glycinate are dissolved in 75 ml. of dioxane. Added are 13 ml. of dioxane containing 0.428 mg. of HBr per ml. The reaction mixture is shaken at room temperature for 90 minutes, when the prednisolone-21-glycinate-HBr separates as a brown oil. Subsequently the dioxane is evaporated in vacuo and the oily residue is further treated as described in Example IVb. The yield of Δ¹,⁴-3,11,20-trioxo-17α,21-dihydroxy-pregnadiene-21-glycinate-HBr amounts to 8.29 g.; $(\alpha)_D = +147.5°$ (ethanol). U.V. absorption:

Lambda max. (ethanol)=238 mμ; epsilon=14,400
Lambda max. (water)=244 mμ; epsilon=14,400

Analysis.—Calculated for $C_{23}H_{30}O_6NBr$: N=2.80%. Found: N=2.56%.

In a corresponding manner the following salts have been prepared:

Prednisone-21-alaninate-HBr
Prednisone-21-phenyl alaninate-HBr

Example VIa 21.6 g. of Δ¹,⁴-3,20-dioxo-11β,7α,21-trihydroxy-pregnadiene and 15 g. of carbobenzoxy-d-alanine are dissolved in 250 ml. of absolute dioxane. 6 ml. of ethoxyacetylene are added to this solution, after which the mixture is further treated in an analogous manner as described in Example Va. Obtained are 15.5 g. of prednisolone-21-(N-carbobenzoxy)-d-alaninate containing 1 mol of crystal alcohol. To remove the crystal alcohol the compound is dissolved in chloroform and precipitated therefrom with ether. The M.P. is 156–157.5° C.; $(\alpha)_D = +103.7°$ (chloroform). Lambda max. (ethanol)=243 mμ; epsilon=14,800.

Analysis.—Calculated for $C_{32}H_{39}O_8N$: N=2.47%. Found: N=2.39%.

In an analogous manner the following derivatives of the prednisolone have been prepared:

Prednisolone-21-(N-carbobenzoxy)-glycinate and
Prednisolone-21-(N-carbobenzoxy)-phenyl alaninate

Example VIb 13.55 g. of $\Delta^{1,4}$-3,20-dioxo-11$\beta$,17$\alpha$,21-trihydroxy-pregnadiene-21-(N-carbobenzoxy)-d-alaninate are dissolved in 60 ml. of absolute dioxane. To this solution are added 10 ml. of absolute dioxane containing 0.49 g. of HBr per ml. of dioxane. The reaction mixture is shaken at room temperature for 90 minutes, in which an oily residue is formed. The mixture is then evaporated to dryness in vacuo, after which the residue is dissolved in water. This aqueous solution is washed with ether, treated with norit, filtered, and then lyophilized. Obtained are 9.5 g. of prednisolone-21-d-alaninate-HBr. After a few recrystallizations from a mixture of absolute ethanol and ether the pure compound is obtained; $(\alpha)_D = +106°$ (96% ethanol).

Lambda max. (ethanol)=243m$\mu$; epsilon=14,100
Lambda max. (water)=247 m$\mu$; epsilon=13,700

*Analysis.*—Calculated for $C_{24}H_{34}O_6NBr$: N=2.73%. Found: N=2.45%.

In an analogous manner the following amino acid esters have been prepared:

Prednisolone-21-glycinate-HBr and
Prednisolone-21-phenyl alaninate-HBr

Example VIIa 10.86 g. of $\Delta^4$-3-20-dioxo-11$\beta$,17$\alpha$,21-trihydroxy-pregnene, 6.40 g. of carbobenzoxyglycine in 130 ml. of dichloroethane, and 3 ml. of ethoxyacetylene are heated for 8 hours, while stirring. Then the reaction mixture is evaporated to dryness in vacuo and the residue is subsequently treated in an analogous manner as described in Example IVa.

Obtained is the $\Delta^4$-3,20-dioxo-11$\beta$,17$\alpha$,21-trihydroxy-pregnene-21-(N-carbobenzoxy)-glycinate.

*Analysis.*—Calculated for $C_{31}H_{39}O_8N$: N=2.53%. Found: N=2.45%. Lambda max. (alc.)=242 m$\mu$; epsilon=16,000.

In a corresponding manner the following N-carbobenzoxy-amino acid esters of hydrocortisone have been prepared:

Hydrocortisone-21-(N-carbobenzoxy)-alaninate
Hydrocortisone-21-(N-carbobenzoxy)-phenyl alaninate

Example VIIb 2.8 g. of $\Delta^4$-3,20-dioxo-11$\beta$,17$\alpha$,21-trihydroxypregnene-21-(N-carbobenzoxy)-glycinate are dissolved in 15 ml. of absolute dioxane. Then 3.5 ml. of dioxane containing 13% hydrobromic acid are added to the solution. The reaction mixture is then treated as described in Example IVb.

Obtained is the $\Delta^4$-3,20-dioxo-11$\beta$,17$\alpha$,21-trihydroxy-pregnene-21-glycinate-HBr.

*Analysis.*—Calculated for $C_{23}H_{34}O_6NBr$: N=2.80%. Found: N=2.61%. Lambda max. (alc.)=242 m$\mu$; epsilon=14,500.

In an analogous manner the following salts have been prepared:

Hydrocortisone-21-alaninate-HBr
Hydrocortisone-21-phenyl alaninate-HBr

Example VIIIa 16.44 g. of 19-nor-testosterone and 1 g. of carbobenzoxy-dl-phenyl alanine are suspended in 1 ml. of benzene. 7 ml. of ethoxy acetylane are added to this solution, after which the reaction mixture is refluxed for 8 hours. After completion of the reaction the mixture is evaporated to dryness in vacuo, after which the residue is chromatographed over silica gel. As elution agent is applied benzene with an increasing ether content. From the benzene-ether fractions (23:2) 19.63 g. of 19-nor-testosterone-17$\beta$-(N-carbobenzoxy)-dl-phenyl alaninate are isolated. The M.P. is 55–60° C.; $(\alpha)_D = +31.7°$ C. (chloroform).

*Analysis.*—Calculated for $C_{35}H_{41}O_5N$: N=2.52%. Found: N=2.63%.

Lambda max. (96% ethanol)=240 m$\mu$
Epsilon=16,100

In a corresponding manner the following derivatives have been prepared:

19-nor-testosterone-17$\beta$-(N-carbobenzoxy)-glycinate and
19-nor-testosterone-17$\beta$-(N-carbobenzoxy)-alaninate

Example VIIIb 4 g. of 19-nor-testosterone-17$\beta$(carbobenzoxy)-dl-phenyl-alaninate are dissolved in 150 ml. of absolute dioxane. In an analogous manner as described in Example IIIb the mixture is converted into the 19-nor-testosterone-17$\beta$-dl-phenyl alaninate-HBr.

*Analysis.*—Calculated for $C_{27}H_{36}O_3NBr$: N=2.79%. Found: N=2.51%.

Lambda max. (alc.)= 239 m$\mu$; epsilon=15,000.

In the same manner the following salts have been prepared:

19-nor-testosterone-17$\beta$-glycinate-HBr and
19-nor-testosterone-17$\beta$-alaninate-HBr

We claim:

1. A compound selected from the group consisting of oestradiol-3,17-di-alaninate and the acid addition salts thereof.
2. A compound selected from the group consisting of oestradiol-3,17-di-phenylalaninate and the acid addition salts thereof.
3. A compound selected from the group consisting of cortisone-21-alaninate and the acid addition salts thereof.
4. A compound selected from the group consisting of cortisone-21-phenylalaninate and the acid addition salts thereof.
5. A compound selected from the group consisting of prednisone-21-alaninate and the acid addition salts thereof.
6. A compound selected from the group consisting of prednisone-21-phenylalaninate and the acid addition salts thereof.
7. A compound selected from the group consisting of prednisolone-21-alaninate and the acid addition salts thereof.
8. A compound selected from the group consisting of prednisolone-21-phenylalaninate and the acid addition salts thereof.
9. A compound selected from the group consisting of hydrocortisone-21-alaninate and the acid addition salts thereof.
10. A compound selected from the group consisting of hydrocortisone-21-phenylalaninate and the acid addition salts thereof.

References Cited in the file of this patent
UNITED STATES PATENTS

| | | |
|---|---|---|
| 2,173,423 | Miescher et al. | Sept. 19, 1939 |
| 2,547,949 | Lawson et al. | Apr. 10, 1951 |
| 2,547,961 | Mooradian et al. | Apr. 10, 1951 |
| 2,660,586 | Murray et al. | Nov. 24, 1953 |
| 2,708,651 | Laubach | May 17, 1955 |
| 2,751,402 | Schneider | June 19, 1956 |
| 2,816,902 | Gould et al. | Dec. 17, 1957 |
| 2,818,408 | Campbell et al. | Dec. 31, 1957 |
| 2,838,534 | Babcock et al. | June 10, 1958 |
| 2,840,581 | Hogg et al. | June 24, 1958 |
| 2,871,160 | Johnson et al. | Jan. 27, 1959 |
| 2,885,413 | Hogg et al. | May 5, 1959 |

UNITED STATES PATENT OFFICE
CERTIFICATION OF CORRECTION

Patent No. 2,979,518                      April 11, 1961

David Adriaan van Dorp et al.

It is hereby certified that error appears in the above numbered patent requiring correction and that the said Letters Patent should read as corrected below.

Column 2, line 35, for "btuyric" read -- butyric --; line 51, for "esteterification" read -- esterification --; column 4, line 32, for "3-ketone-" read -- 3-keto- --; column 5, line 26, strike out "Found:"; column 6, line 58, for "7α" read -- 17α --; column 7, line 65, for "1 g." read -- 18 g. --; line 65, for "1 ml." read -- 150 ml. --.

Signed and sealed this 29th day of August 1961.

(SEAL)
Attest:

ERNEST W. SWIDER
Attesting Officer

DAVID L. LADD
Commissioner of Patents